United States Patent
Kinser et al.

(10) Patent No.: US 11,112,032 B2
(45) Date of Patent: Sep. 7, 2021

(54) TAPERED ANTI-CAVITATION CAGE

(71) Applicant: FISHER CONTROLS INTERNATIONAL LLC, Marshalltown, IA (US)

(72) Inventors: Andrew Kinser, Marshalltown, IA (US); Paul T. Alman, Marshalltown, IA (US)

(*) Notice: Subject to any disclaimer, the term of this patent is extended or adjusted under 35 U.S.C. 154(b) by 77 days.

(21) Appl. No.: 16/565,049

(22) Filed: Sep. 9, 2019

(65) Prior Publication Data

US 2021/0071779 A1 Mar. 11, 2021

(51) Int. Cl.
| F16K 47/08 | (2006.01) |
| F16K 3/26 | (2006.01) |
| F16K 47/16 | (2006.01) |

(52) U.S. Cl.
CPC .............. F16K 47/08 (2013.01); F16K 3/265 (2013.01); F16K 47/16 (2013.01); *Y10T 137/86759* (2015.04); *Y10T 137/86767* (2015.04); *Y10T 137/86775* (2015.04)

(58) Field of Classification Search
CPC .. F16K 3/265; F16K 47/08; Y10T 137/86775; Y10T 137/86767; Y10T 137/86759
See application file for complete search history.

(56) References Cited

U.S. PATENT DOCUMENTS

| 2,847,183 | A | * | 8/1958 | Buri | F16K 47/08 |
| | | | | | 251/363 |
| 3,954,124 | A | * | 5/1976 | Self | F16K 3/34 |
| | | | | | 138/42 |
| 3,971,411 | A | * | 7/1976 | Baumann | F16K 1/54 |
| | | | | | 137/625.3 |
| 4,108,210 | A | * | 8/1978 | Luthe | F16K 47/08 |
| | | | | | 137/625.28 |
| 4,249,574 | A | * | 2/1981 | Schnall | F15C 1/02 |
| | | | | | 137/625.3 |
| 4,258,750 | A | * | 3/1981 | Schnall | F16K 47/045 |
| | | | | | 137/625.3 |
| 4,473,210 | A | * | 9/1984 | Brighton | F16K 47/045 |
| | | | | | 137/625.3 |
| 4,617,963 | A | * | 10/1986 | Stares | F16K 47/08 |
| | | | | | 137/625.3 |
| 4,712,769 | A | * | 12/1987 | Johnson | F16K 47/08 |
| | | | | | 251/189 |

(Continued)

*Primary Examiner* — Umashankar Venkatesan

(74) *Attorney, Agent, or Firm* — Marshall, Gerstein & Borun LLP

(57) ABSTRACT

A control valve includes a cage is disposed within a valve body adjacent to a valve seat. The cage includes a first sleeve and a second sleeve. The first sleeve includes a first circumferential wall having a first inner surface, a first outer surface, and a first longitudinal axis. The first sleeve also includes a first plurality of openings disposed in the first circumferential wall. The second sleeve includes a second circumferential wall having a second inner surface and a second outer surface and a second longitudinal axis. The second sleeve also includes a second plurality of openings disposed in the second circumferential wall. The first outer surface of the first circumferential wall is tapered at a first angle relative to the first longitudinal axis, and the second inner surface of the second circumferential wall is tapered at a second angle relative to the first longitudinal axis.

22 Claims, 3 Drawing Sheets

(56) References Cited

U.S. PATENT DOCUMENTS

| | | | | |
|---|---|---|---|---|
| 5,018,703 | A * | 5/1991 | Goode | F16K 47/08 137/625.3 |
| 6,505,646 | B1 * | 1/2003 | Singleton | F16K 47/08 137/625.3 |
| 6,637,452 | B1 * | 10/2003 | Alman | F16K 3/243 137/244 |
| 9,759,348 | B2 * | 9/2017 | Adams | F16K 47/08 |
| 10,605,370 | B2 * | 3/2020 | Hammond | F16K 1/52 |
| 2006/0207666 | A1 * | 9/2006 | Micheel | F16K 3/246 137/625.3 |

* cited by examiner

TAPERED ANTI-CAVITATION CAGE

FIELD OF THE DISCLOSURE

The disclosure relates generally to control valves and, more particularly, anti-cavitation cages for fluid control valves.

BACKGROUND

Control valves are commonly used in process plants to control the flow of a fluid (e.g., a gas, a liquid, etc.) or any other substance through pipes and/or vessels to which they are connected. A control valve typically includes one or more fluid inlets and fluid outlets, and also includes a fluid control element or member (e.g., a valve gate, a piston, a valve plug, a control member, etc.) that operates to control fluid flow through apertures that fluidly couple the inlet(s) to the outlet(s). A control member is typically coupled to a valve bonnet that is mechanically coupled (e.g., bolted, clamped, threaded into, etc.) to the valve body. The control member is usually configured to engage a sealing structure (e.g., a valve seat) that encompasses a flow path through the valve. A regulator is a self-controlling form of a control valve.

Generally speaking the control elements (including the fluid control member, the seat, and a cage) are known as "valve trim" or "trim assembly" in the art. In some cases it may be desirable to characterize fluid as it flows through the valve, for example, to reduce pressure or to reduce cavitation. In these cases, a trim assembly may be used that includes a cage with a plurality of openings that are drilled, cast, punched, machined etc., through a wall of the cage. The openings may be sized and shaped to characterize fluid flow as the fluid flows through the openings in the cage, for example by decreasing pressure as the fluid moves through the valve trim. This characterization or pressure reducing process generates unwanted noise. Currently, cavitation is controlled by using pressure drops and sound reduction is done by cages having a plurality of holes drilled, cast, punched, machined, etc., into a cage wall.

Referring now to FIG. 1, a typical prior art control valve 10 is illustrated. The control valve 10 generally includes a valve body 12 having an inlet 14 and an outlet 16 and a passageway 18 disposed between the inlet 14 and the outlet 16. A valve seat 24 is disposed in the passageway 18 between the inlet 14 and the outlet 16 and a cage 22 is disposed within the valve body 12 adjacent the valve seat 24. A fluid control member, such as a valve plug 26, is positioned within the body 12 and movably disposed within the cage 22. The valve plug 26 interacts with the valve seat 24 to control fluid flow through the body 12, such that the valve plug 26 sealingly engages the valve seat 24 in a closed position and is spaced away from the valve seat 24 in an open position. A stem 28 is connected to the valve plug 26 at one end and to an actuator 30 at another end. Actuator 30 controls movement of the valve plug 26 within the cage 22. The cage 22 is positioned adjacent to the valve seat 24 and proximate the valve plug 26 to provide guidance for the valve plug 26 as the valve plug 26 moves within the cage 22.

In some fluid applications, the cage 22 includes a plurality of passages or openings 20 formed through a circumferential wall of cage 22. The openings 20 function to reduce the noise produced as the fluid passes through the cage 22. The passages 20 are spaced such that jets of fluid that are produced as the fluid exits the passages 20 do not converge to produce noise. The cage 22 may be oriented in a "flow up" orientation (e.g., the fluid enters the center of the cage 22 from the bottom in FIG. 1 and passes from an inside surface to an outside surface of the cage 22) and the spacing of the passages 20 reduces the noise at the outer surface of the cage 22, or in a "flow down" orientation. The spacing of the passages 20 on the inner surface of the cage 22 meters fluid flow to pass through the desired number of passages 20 for a given valve plug 26 position to characterize the fluid flow throughout the travel of the valve plug 26.

For cages 22 used in fluid applications where the process conditions produce cavitation or noise as the gas flows through control valve 10, holes are individually drilled through the circumferential wall of cage 22 to form the passages 20. However, drilled hole cages are very cumbersome, time consuming, and costly to produce. Some drilled hole cages may contain thousands of holes and the only real feasible way to produce passages 20 drill each passage 20 individually drill bit. Acceptance criteria exists that allows a percentage of drill bits to break and be left in the cage and this process requires the use of special drilling machines that have a high degree of accuracy.

In addition to the spacing of the passages 20 on the outer surface of the cage 22, noise can also be reduced by providing a tortured, or non-linear, flow path for passages 20 or by varying a cross-sectional diameter of the passages 20. However, with drilled holes through a solid cage 22, creating passages 20 having a non-linear flow path or having a variable cross-sectional area is not possible.

In addition to the noise issues that can be encountered in some gas applications, in some liquid applications, conditions can occur that will produce a condition where the liquid cavitates, which can cause damage to components of the control valve 10. In order to reduce cavitation to the point that it does not damage control valve 10 or to direct cavitation to an area that is less susceptible to damage, passages that decrease in diameter in the direction of fluid flow can be used.

However, drilling holes by conventional manufacturing techniques to create the passages 20 in the cage 22 wall requires that the holes be step drilled from the outer surface of the cage, which limits the holes to having a larger diameter portion at the outer surface of cage 22 and a smaller diameter portion of passage 20 at the inner surface of cage 22, since the holes must be drilled from the outside of cage 22.

While recently some cages 22 have been manufactured with multiple sleeves to produce different passage 20 configurations, these sleeves are assembled with shrink fit joints where the outer sleeve is expanded (usually via heating) and/or the inner sleeve is contracted (usually via cooling) before assembly, and after assembly, the sleeves contract and/or expand, respectively, to produce a tight shrink fit joint. One problem with the current sleeve configuration is that once the cage is assembled, it cannot be disassembled (as the sleeves require opposite thermal inputs to expand/retract, which is not possible when the sleeves are joined). Thus, the entire cage 22 must be replaced when damaged, even if the damage is only to one of the sleeves.

BRIEF SUMMARY OF THE DISCLOSURE

In accordance with one exemplary aspect, a control valve, includes a body having an inlet and an outlet. A valve seat is positioned in a passageway of the body between the inlet and the outlet. A valve plug is positioned within the body and movable between a closed position, in which the valve plug sealingly engages the valve seat, and an open position, in which the valve plug is spaced away from the valve seat. A cage is disposed within the body adjacent the valve seat, the cage provides longitudinal guidance for the valve plug as the valve plug moves longitudinally within the cage. The cage includes a first sleeve and a second sleeve. The first sleeve includes a first circumferential wall having a first inner surface, a first outer surface, and a first longitudinal axis. The first sleeve also includes a first plurality of openings disposed in the first circumferential wall. The second sleeve includes a second circumferential wall having a second inner surface and a second outer surface and a second longitudinal axis. The second sleeve also includes a second plurality of openings disposed in the second circumferential wall. The first longitudinal axis and the second longitudinal axis are co-axial. The first outer surface of the first circumferential wall is tapered at a first angle relative to the first longitudinal axis, and the second inner surface of the second circumferential wall is tapered at a second angle relative to the first longitudinal axis.

In accordance with another exemplary aspect, a cage for a control valve includes a first sleeve and a second sleeve. The first sleeve includes a first circumferential wall having a first inner surface, a first outer surface, and a first longitudinal axis. The first sleeve also includes a first plurality of openings disposed in the first circumferential wall. The second sleeve includes a second circumferential wall having a second inner surface and a second outer surface and a second longitudinal axis. The second sleeve also includes a second plurality of openings disposed in the second circumferential wall. The first longitudinal axis and the second longitudinal axis are co-axial. The first outer surface of the first circumferential wall is tapered at a first angle relative to the first longitudinal axis, and the second inner surface of the second circumferential wall is tapered at a second angle relative to the first longitudinal axis.

In further accordance with any one or more of the foregoing exemplary aspects, a control valve or cage for a control valve may further include, in any combination, any one or more of the following preferred forms.

In one preferred form, the first and second angles are substantially the same.

In another preferred form, the first angle is between 0.5 degrees and 15 degrees, preferably between 1 degree and 5 degrees.

In yet another preferred form, the second angle is between 0.5 degrees and 15 degrees, preferably between 1 degree and 5 degrees.

In yet another preferred form, a third sleeve includes a third circumferential wall having a third inner surface and a third outer surface and a third longitudinal axis, the third sleeve including a third plurality of openings disposed in the third circumferential wall, the third longitudinal axis being co-axial with the first longitudinal axis, and the third inner surface of the third circumferential wall is tapered at a third angle relative to the first longitudinal axis.

In yet another preferred form, the second and third angles are substantially the same.

In yet another preferred form, the third angle is between 0.5 degrees and 15 degrees, preferably between 1 degree and 5 degrees.

In yet another preferred form, the first circumferential wall tapers downwardly, getting narrower from top to bottom.

DETAILED DESCRIPTION

Although the following text discloses a detailed description of example methods, apparatus and/or articles of manufacture, it should be understood that the legal scope of the property right is defined by the words of the claims. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
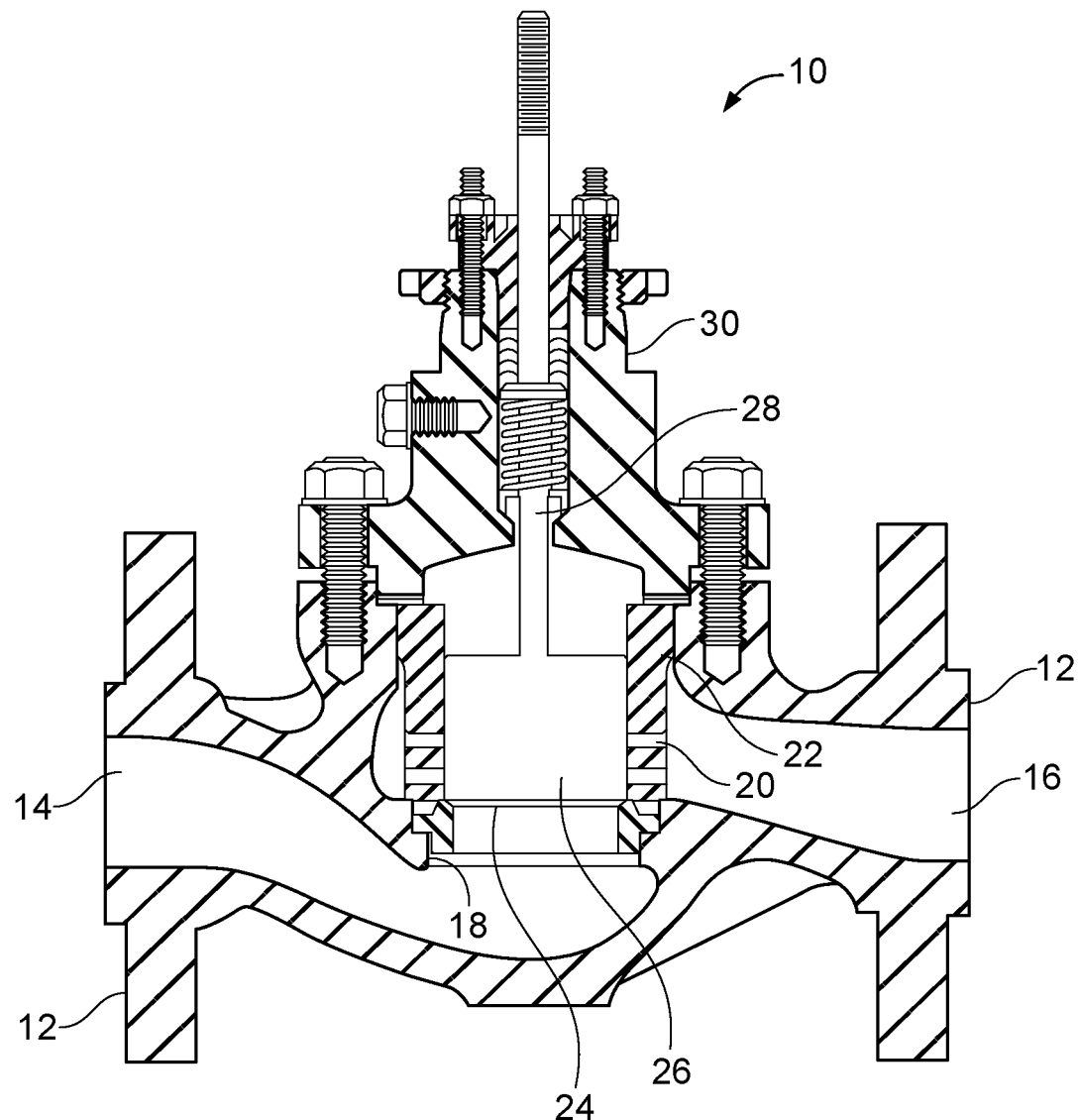
FIG. 1 is a cross-sectional view of a prior art control valve.
Figure 2:
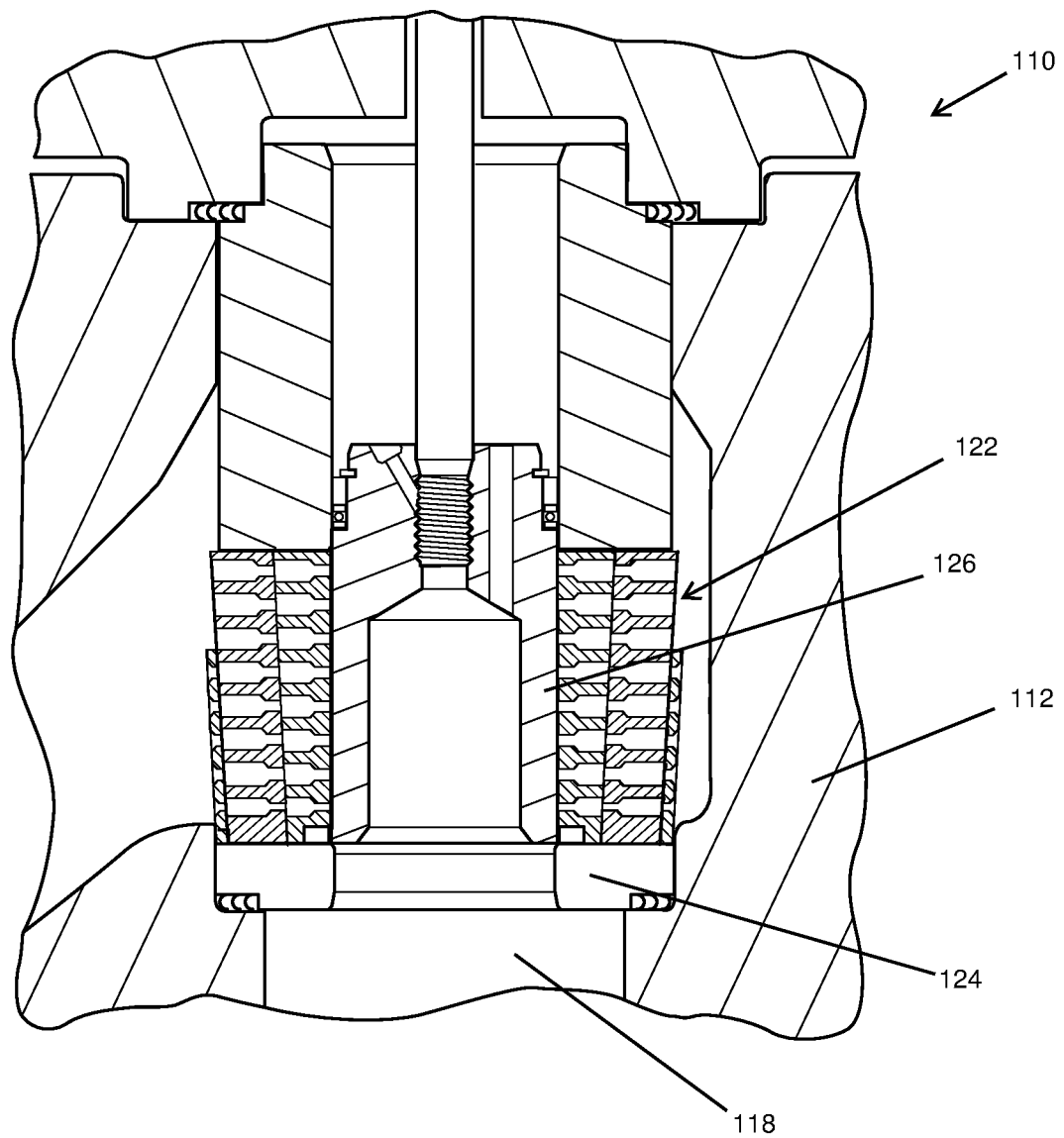
FIG. 2 is a cross-sectional view of a control valve and cage constructed in accordance with the teachings of the disclosure.
Figure 3:
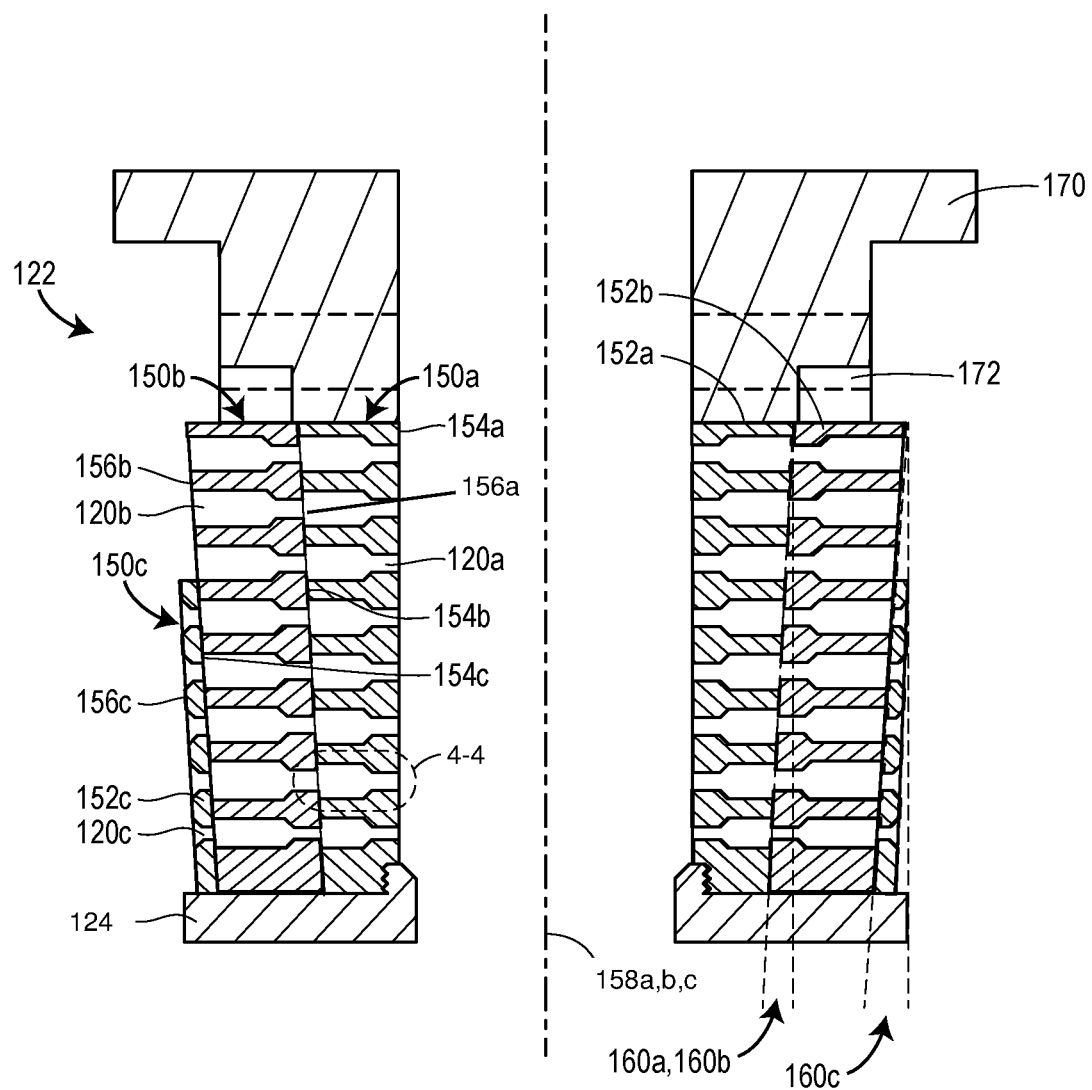
FIG. 3 is a cross-sectional view of the valve cage of FIG. 2.

Turning now to FIGS. 2 and 3, a cage 122 constructed in accordance with the teachings of the disclosure is illustrated. The cage 122 illustrated in FIG. 2, may be substituted for the cage 22 of FIG. 1 in a control valve. The control valve 110 structure of FIG. 2 is the same as the control valve 10 structure of FIG. 1, except for the cage 122. For example, the control valve 110 includes a body 112 having an inlet and an outlet. A valve seat 124 is positioned in a passageway 118 of the body 112 between the inlet and the outlet. A valve plug 126 is positioned within the body 112 and movable between a closed position, in which the valve plug 126 sealingly engages the valve seat 124, and an open position, in which the valve plug 126 is spaced away from the valve seat 124.

The cage 122 is disposed within the body 112 adjacent the valve seat 124. The cage 122 provides longitudinal guidance for the valve plug 126 as the valve plug 126 moves longitudinally within the cage 122.

In the illustrated embodiment, the cage 122 includes a first sleeve 150a, a second sleeve 150b, and a third sleeve 150c. The first sleeve 150a includes a first circumferential wall 152a having a first inner surface 154a, a first outer surface 156a, and a first longitudinal axis 158a. The first sleeve 150a also includes a first plurality of openings 120a disposed in the first circumferential wall 152a.

The second sleeve 150b includes a second circumferential wall 152b having a second inner surface 154b and a second outer surface 156b and a second longitudinal axis 158b. The second sleeve 150b also includes a second plurality of openings 120b disposed in the second circumferential wall 152b.

In the illustrated embodiment, a third sleeve 150c includes a third circumferential wall 152c having a third inner surface 154c and a third outer surface 156c and a third longitudinal axis 158c. The third sleeve 150c also includes a third plurality of openings 120c disposed in the third circumferential wall 152c. The third longitudinal axis 158c is co-axial with the first longitudinal axis 158a, and the second longitudinal axis 158b. In other embodiments, the cage 122 may omit the third sleeve 150c and only include the first and second sleeves 150a, 150b.

The first longitudinal axis 158a, the second longitudinal axis 158b, and the third longitudinal axis 158c are all co-axial, when the first sleeve 150a, the second sleeve 150b, and the third sleeve 150c are assembled. The first outer surface 156a of the first circumferential wall 152a is tapered at a first angle 160a relative to the first longitudinal axis 158a. The second inner surface 154b of the second circumferential wall 152b is tapered at a second angle 160b relative to the first longitudinal axis 158a. The third inner surface 154c of the third circumferential wall 152c is tapered at a third angle 160c relative to the first longitudinal axis 158a.

The taper angles 160a, 160b, 160c advantageously allow inner sleeves to slide down into outer sleeves and into position without removing the cage 122 from the control valve. Similarly, inner sleeves may slide up relative to outer sleeves to disassemble the cage 122 for maintenance (e.g., cleaning), repair, or replacement of sleeves.

In the illustrated embodiment, the first angle 160a and second angle 160b are substantially the same. The first angle 160a, and the second angle 160b lie in a range of between 0.5 degrees and 15 degrees, preferably between 1 degree and 5 degrees.

Similarly, in the illustrated embodiment, the third angle 160c is substantially the same as the first angle 160a and the second angel 160b. In the illustrated embodiment, the third angle 160c lies in a range of between 0.5 degrees and 15 degrees, preferably between 1 degree and 5 degrees. In other embodiments, the third angle 160c may differ from the first angle 160a and the second angle 160b, although the third angle 160c may still lie in the range of between 0.5 degrees and 15 degrees.

Angles in the disclosed range advantageously allow assembly and separation of the sleeves while producing enough friction between sleeves when assembled to form interference tight fit between sleeves.

In the illustrated embodiment, a cap 170 may keep the first sleeve 150a and the second sleeve 150b properly located once installed. In some embodiments, an additional spacer ring 172 may also be used. In some embodiments, the cap 170 and the spacer ring 172 may be integrally formed. In other embodiments, where the cap 170 and the spacer ring 172 are separate elements, they may be sealed with a gasket to prevent leakage.

In the illustrated embodiment, the third sleeve 150c is shorter than the first sleeve 150a and the second sleeve 150b. However, in other embodiments, the third sleeve 150c may be the same length as the first sleeve 150a and/or the second sleeve 150b. In some embodiments, a spacer pin or screw may be used to positively locate and align the sleeves 150a, 150b, 150c.

In the illustrated embodiment, the first circumferential wall 152a tapers downwardly, getting narrower from top to bottom, towards the valve seat 124. In other embodiments, the first circumferential wall 152a may taper in the opposite direction. Similarly, the second outer surface 156b and the third outer surface 156c may taper in the opposite direction in other embodiments.

Figure 4:
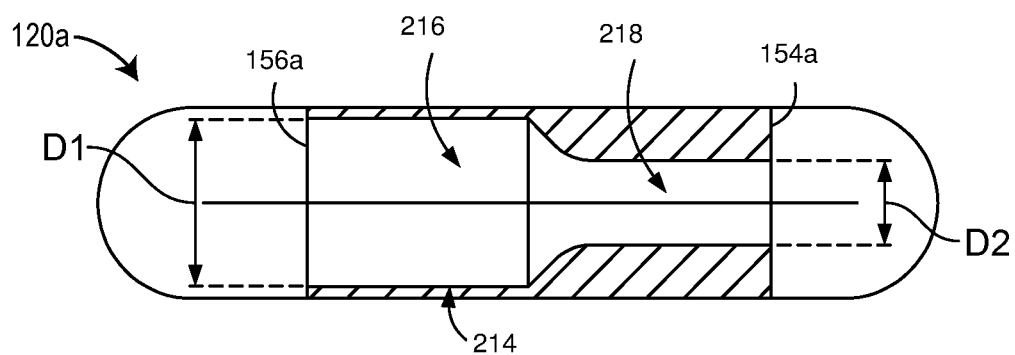
FIG. 4 is a cross-sectional view of an opening of the cage of FIG. 3.

Turning now to FIG. 4, one example of the opening 120a is illustrated. Although the opening 120a is illustrated having a generally circular cross-sectional area with a longitudinal axis that is perpendicular to the longitudinal axis of cage 122 in FIG. 3, other shapes are possible in other embodiments. For example, the openings 120a can also have other non-circular cross-sectional area, such as square, rectangle, triangle, oval, star, polygon, and irregular shapes. Additionally, the description of the openings 120a in the first sleeve 150a apply equally to openings in the second sleeve 150b and in the third sleeve 150c.

The openings 120a are formed by passages 214 in the circumferential wall 152a. the passages 214, extend between the first inner surface 154a and the first outer surface 156a. The passages 214 include a first portion 216 having a larger diameter and a second portion 218 having a smaller diameter. The passages 214 can be used to characterize fluid flowing through cage 122 by, for example, reducing the pressure of the fluid as it flows through passages 214. The first portion 216 extends from the first outer surface 156a partially into the first circumferential wall 152a and has a first diameter D1, or cross-sectional area if passages 214 are not circular. The second portion 218 extends from the first inner surface 154a partially into the first circumferential wall 152a and has a second diameter D2, or cross-sectional area if passages 214 are not circular, that is smaller than diameter D1 of first portion 216.

Having passages 214 decrease in diameter from first inner surface 154a to the first outer surface 156a, which was not possible using standard manufacturing methods, means that cage 122 can now be used in fluid applications to reduce cavitation in control valves having either a "flow up" orientation or a "flow down" orientation, and the design is not restricted from a manufacturing standpoint. In addition, having cages that can be in either "flow up" or "flow down" orientations allows piping flexibility to end users for any given application and provides more flexibility for more seal configurations, which can be flow direction dependent.

The cage 122 can be manufactured using Additive Manufacturing Technology, such as direct metal laser sintering, full melt powder bed fusion, etc. Using an Additive Manufacturing Technology process, the 3-dimensional design of cage 122 is divided into multiple layers, for example layers approximately 20-50 microns thick. A powder bed, such as a powder based metal, is then laid down representing the first layer of the design and a laser or electron beam sinters together the design of the first layer. A second powder bed, representing the second layer of the design, is then laid down over the first sintered layer and the second layer is sintered together. This continues layer after layer to form the completed cage 122.

Using an Additive Manufacturing Technology process to manufacture cages for control valves allows the freedom to produce passages having various shapes and geometries, and other feature described below, that are not possible using current standard casting or drilling techniques. For example, as described above, cages used in liquid applications can be manufactured having passages that decrease in diameter in the direction of fluid flow to reduce cavitation in the control valve. However, using standard manufacturing techniques, these cages were limited to applications using a "flow down" orientation as the larger diameter portion of each passage could only be drilled/machined on the outer surface of the cage. However, the cage 120 can now be manufactured having passages that decrease in diameter from the inner surface to the outer surface, allowing the cage 122 to be used in applications using a "flow up" orientation, which was not previously possible.

The control valves and valve cages described herein advantageously allow stages to be added and/or removed after assembly. Additionally, the disclosed valve cages are easily disassembled for cleaning and/or to replace stages that are damaged.

What is claimed is:
1. A control valve, comprising:
a body having an inlet and an outlet;
a valve seat positioned in a passageway of the body between the inlet and the outlet;
a valve plug positioned within the body and movable between a closed position, in which the valve plug sealingly engages the valve seat, and an open position, in which the valve plug is spaced away from the valve seat; and a cage disposed within the body adjacent the valve seat, the cage providing longitudinal guidance for the valve plug as the valve plug moves longitudinally within the cage, the cage comprising:

a first sleeve having a first circumferential wall having a first inner surface and a first outer surface and a first longitudinal axis, the first sleeve including a first plurality of openings disposed in the first circumferential wall; and a second sleeve having a second circumferential wall having a second inner surface and a second outer surface and a second longitudinal axis, the second sleeve including a second plurality of openings disposed in the second circumferential wall, wherein the first longitudinal axis and the second longitudinal axis are co-axial, and wherein the first outer surface of the first circumferential wall is tapered at a first angle relative to the first longitudinal axis, and the second inner surface of the second circumferential wall is tapered at a second angle relative to the first longitudinal axis.

2. The control valve of claim 1, wherein the first and second angles are substantially the same.

3. The control valve of claim 1, wherein the first angle is between 0.5 degrees and 15 degrees.

4. The control valve of claim 3, wherein the first angle is between 1 degree and 5 degrees.

5. The control valve of claim 1, wherein the second angle is between 0.5 degrees and 15 degrees.

6. The control valve of claim 5, wherein the second angle is between 1 degree and 5 degrees.

7. The control valve of claim 1, further comprising a third sleeve, the third sleeve having a third circumferential wall having a third inner surface and a third outer surface and a third longitudinal axis, the third sleeve including a third plurality of openings disposed in the third circumferential wall, wherein the third longitudinal axis is co-axial with the first longitudinal axis, and wherein the third inner surface of the third circumferential wall is tapered at a third angle relative to the first longitudinal axis.

8. The control valve of claim 7, wherein the second and third angles are substantially the same.

9. The control valve of claim 7, wherein the third angle is between 0.5 degrees and 15 degrees.

10. The control valve of claim 9, wherein the third angle is between 1 degree and 5 degrees.

11. The control valve of claim 1, wherein the first circumferential wall tapers downwardly, getting narrower from top to bottom.

12. A cage for a control valve, the cage comprising:

a first sleeve having a first circumferential wall having a first inner surface and a first outer surface and a first longitudinal axis, the first sleeve including a first plurality of openings disposed in the first circumferential wall; and a second sleeve having a second circumferential wall having a second inner surface and a second outer surface and a second longitudinal axis, the second sleeve including a second plurality of openings disposed in the second circumferential wall, wherein the first longitudinal axis and the second longitudinal axis are co-axial, and wherein the first outer surface of the first circumferential wall is tapered at a first angle relative to the first longitudinal axis, and the second inner surface of the second circumferential wall is tapered at a second angle relative to the first longitudinal axis.

13. The cage of claim 12, wherein the first and second angles are substantially the same.

14. The cage of claim 12, wherein the first angle is between 0.5 degrees and 15 degrees.

15. The cage of claim 14, wherein the first angle is between 1 degree and 5 degrees.

16. The cage of claim 12, wherein the second angle is between 0.5 degrees and 15 degrees.

17. The cage of claim 16, wherein the second angle is between 1 degree and 5 degrees.

18. The cage of claim 12, further comprising a third sleeve, the third sleeve having a third circumferential wall having a third inner surface and a third outer surface and a third longitudinal axis, the third sleeve including a third plurality of openings disposed in the third circumferential wall, wherein the third longitudinal axis is co-axial with the first longitudinal axis, and wherein the third inner surface of the third circumferential wall is tapered at a third angle relative to the first longitudinal axis.

19. The cage of claim 18, wherein the second and third angles are substantially the same.

20. The cage of claim 18, wherein the third angle is between 0.5 degrees and 15 degrees.

21. The cage of claim 20, wherein the third angle is between 1 degree and 5 degrees.

22. The cage of claim 12, wherein the first circumferential wall tapers downwardly, getting narrower from top to bottom.

* * * * *

UNITED STATES PATENT AND TRADEMARK OFFICE
CERTIFICATE OF CORRECTION

PATENT NO. : 11,112,032 B2
APPLICATION NO. : 16/565049
DATED : September 7, 2021
INVENTOR(S) : Andrew Kinser et al.

It is certified that error appears in the above-identified patent and that said Letters Patent is hereby corrected as shown below:

In the Specification

At Column 4, Line 3, "disclosure:" should be -- disclosure; --.

At Column 5, Line 20, "angel" should be -- angle --.

At Column 5, Line 62, "apply" should be -- applies --.

At Column 5, Line 65, "152a. the" should be -- 152a. The --.

Signed and Sealed this
Twenty-fourth Day of May, 2022

*Katherine Kelly Vidal*

Katherine Kelly Vidal
*Director of the United States Patent and Trademark Office*